3,600,403
HYDROGENATION OF PYRONE COMPOUNDS
Hans Brinkhoff, Munich, Germany, assignor to Spezial-
chemie Gesellschaft mit beschrankter Haftung und Co.,
Arzneimittelfabrik, Munich, Germany
No Drawing. Filed Nov. 24, 1967, Ser. No. 685,340
Int. Cl. C07d 7/10
U.S. Cl. 260—343.5                    6 Claims

ABSTRACT OF THE DISCLOSURE

An improved process of catalytically hydrogenating pyrone compounds being connected by an unsaturated aliphatic bridge with a nuclear substituent and especially a pyrone compound of the following formula

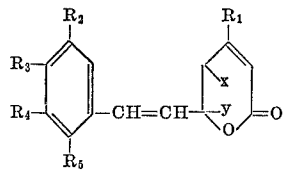

wherein $R_1$ is lower alkoxy with 1 to 5 carbon atoms;

$R_2$, $R_3$, $R_4$, and $R_5$ are members selected from the group consisting of hydrogen, lower alkoxy with 1 to 5 carbon atoms, and $R_3$ and $R_4$ form the methylene dioxy group —O—$CH_2$—O— while $R_2$ and $R_5$ are hydrogen; and $x$ and $y$ are members selected from the group consisting of hydrogen and $x$ and $y$ form the double bond between the carbon atoms 5 and 6 of the pyrone ring, whereby the double bond in the aliphatic bridge is hydrogenated while the double bond in 3,4-position of the pyrone ring remains unaffected and the pyrone ring is not split up. Hydrogenation is effected in the presence of a platinum metal catalyst, preferably of colloidal palladium according to Paal at an initial temperature of —5° C. to —10° C. The final hydrogenation temperature should not exceed +15° C. The yield is almost quantitative.

Examples of pyrone compounds to be hydrogenated are methysticin and kawain yielding dihydromethysticin and dihydrokawain.

BACKGROUND OF INVENTION

The present invention relates to an improved process of hydrogenating pyrone compounds and more particularly to a process of hydrogenating and partially hydrogenating pyrone compounds which are substituted by an alkylene bridge and especially by an unsaturated alkylene bridge carrying a nuclear substituent such as phenyl which may also be substituted, to products obtained thereby, and to a process of using such hydrogenated pyrone compounds.

It is known to catalytically hydrogenate pyrone compounds which contain an aliphatic unsaturated bridge and to produce the corresponding dihydropyrone compounds in which the aliphatic double bond is hydrogenated and saturated ("Berichte der deutschen Chemischen Gesellschaft," vol. 62 (1929), pages 360 to 367). However, the known hydrogenation process also affects the double bonds in the pyrone ring. Thus the yield of the hydrogenation product with hydrogenated aliphatic bridge and unaffected double bond in 3,4-position of the pyrone ring is rather low and, at the most, between 60% and 65%. The remainder of the hydrogenation products are dihydrogenated and/or tetrahydrogenated acids, i.e. the pyrone ring in said known hydrogenation process is split up to a considerable amount. Thus according to the known process shaking a methanolic solution of methysticin at room temperature with hydrogen under a pressure slightly higher than atmospheric pressure in the presence of a palladium catalyst yields not only dihydromethysticin but also tetrahydromethysticinic acid.

SUMMARY OF INVENTION

It is one object of the present invention to provide a simple and highly effective process of hydrogenating pyrone compounds which are connected by means of an aliphatic unsaturated bridge with a nuclear substituent whereby only the aliphatic double bond and, if desired, the 5,6-double bond in the pyrone ring are hydrogenated, but not the 3,4-double bond of the pyrone ring.

Other objects of the present invention and advantageous features thereof will become apparent as the description proceeds.

In principle the process according to the present invention comprises catalytically hydrogenating pyrone compounds which are connected by an unsaturated alkylene bridge to a nuclear substituent, preferably a substituted or unsubstituted benzene ring, in the presence of a hydrogenation catalyst of the platinum group at an initial hydrogenation temperature between about —5° C. and about —10° C. The heat of reaction causes an increase in temperature during hydrogenation. Optimum yields are achieved even if the temperature increases to about 0° C. Care must be taken, however, that the final hydrogenation temperature does not exceed about 15° C. before at least about 50% of the theoretically required hydrogen have been absorbed. As a result of such a low temperature hydrogenation process and, in contrast to the above discussed known hydrogenation process at room or higher temperature, the yield of the hydrogenation products in which the double bond of the alkylene bridge is hydrogenated, is almost quantitative, i.e. between about 95% and 99% of the theoretical yield. No lactone cleavage takes place at such a low temperature and the 3,4-double bond in the pyrone ring is not hydrogenated.

The preferred starting pyrone compounds are compounds of the following Formula I obtained either synthetically or from natural sources and especially from roots of the plant Piper Methysticum, also known as Radix Kawa-Kawa

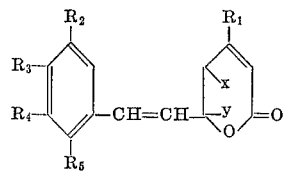

wherein $R_1$ is lower alkoxy with 1 to 5 carbon atoms;

$R_2$, $R_3$, $R_4$, and $R_5$ are members selected from the group consisting of hydrogen, lower alkoxy with 1 to 5 carbon atoms and $R_3$ and $R_4$ form the methylenedioxy group —O—$CH_2$—O— while $R_2$ and $R_5$ are hydrogen; and x and y are members selected from the group consisting of hydrogen and x and y form a double bond between the carbon atom 5 and 6 of the pyrone ring.

Preferred starting materials of this type are, for instance, 4-methoxy-6-(3',4'-methylenedioxy styryl)-5,6-dihydro-α-pyrone, i.e. methysticin and 4-methoxy-6-styryl-5,6-dihydro-α-pyrone, i.e. kawain.

Suitable hydrogenation catalysts are noble metal catalysts such as colloidal palladium or platinum, palladium oxide or platinum oxide, the palladium or platinum catalysts according to Skita described in "Berichte der deutschen Chemischen Gesellschaft," vol. 44, page 2863 (1911), and the like. The preferred catalyst of this type is the palladium catalyst prepared according to Paal.

Hydrogenation is carried out in suitable inert organic solvents. Lower alkanols and especially methanol, ethanol, propanol, and isopropanol have proved to be preferred.

Preferably the starting material is not completely dissolved in the solvent but part of it is in the undissolved state in the hydrogenation mixture. When hydrogenating such a solution of the starting material with undissolved solid material, hydrogenation is continued until all of the undissolved material has just been dissolved, thus indicating that the hydrogenation of the unsaturated bridge has been completed and no opening of the lactone ring has yet taken place.

As is known, the resulting hydrogenation products and especially 4-methoxy-6-phenyl ethyl-5,6-dihydro-α-pyrone or dihydrokawain and 4-methoxy-6-(3',4'-methylene dioxy phenyl ethyl)-5,6-dihydro-α-pyrone or dihydromethysticin have a noteworthy sedative effect upon the central nervous system and possess ataractic, tranquilizing, analgesic, anticonvulsive, spasmolytic, muscle relaxing, and other properties and have found application in therapy.

DESCRIPTION OF PREFERRED EMBODIMENTS

The following examples serve to illustrate the present invention, without, however, limiting the same thereto.

Example 1

300 g. of 4-methoxy-6-(3',4'-methylenedioxy styryl)-5,6-dihydro-α-pyrone, i.e. methysticin, are added to 10 l. of methanol. The mixture is cooled in a refrigerator to a temperature of −10° C. Part of the methysticin remains undissolved. 50 cc. of a colloidal palladium catalyst solution according to Paal "Berichte der deutschen Chemischen Gesellschaft" vol. 37 (1904), page 124) containing 0.75 g. of colloidal palladium are added to said cooled methysticin mixture. Hydrogen is introduced thereinto while shaking the mixture until the undissolved methysticin has just been dissolved. Care is taken that the final hydrogenation temperature does not exceed about 15° C. The reaction mixture is diluted with water to a volume of 10 l. and the hydrogenation product is extracted with ether. After drying the ether extract over sodium sulfate, the solvents are evaporated. 295 g. of 4-methoxy-6-(3',4'-methylenedioxy phenyl ethyl)-5,6-dihydro-α-pyrone, i.e. dihydromethysticin are obtained. Melting point: 116–117° C. which, on recrystallization from methanol, is increased to 117–118° C. Sulfuric acid reaction: Wine-red color.

Example 2

100 g. of 4-methoxy-6-styryl-5,6-dihydro-α-pyrone, i.e. kawain, are added to 500 cc. of methanol. The mixture is cooled in a refrigerator to −5° C. Most of the kawain remains undissolved. 20 cc. of a colloidal palladium catalyst solution according to Paal containing 0.30 g. of colloidal palladium are added to said cooled kawain mixture. Hydrogen is introduced thereinto while shaking the mixture until the undissolved kawain has just been dissolved. The hydrogen introduced into the mixture is also cooled to −5° C. The reaction mixture is worked up as described in Example 1 and yields 98.5 g. of 4-methoxy-6-phenyl ethyl-5,6-dihydro-α-pyrone, i.e. dihydrokawain. Melting point, after recrystallization from ether and precipitation with petroleum ether: 58–60° C. Sulphuric acid reaction: Colorless.

Other pyrone compounds having an unsaturated aliphatic bridge connecting the pyrone ring and the phenyl ring than those mentioned hereinabove in the examples may also be hydrogenated by the low temperature hydrogenation process according to the present invention into the corresponding compounds having a saturated aliphatic bridge between said pyrone ring and the phenyl ring.

I claim:
1. In a process of catalytically hydrogenating a pyrone compound of the formula

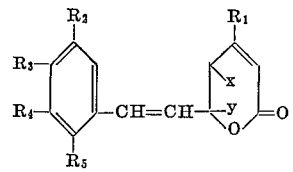

wherein $R_1$ is lower alkoxy with 1 to 5 carbon atoms;

$R_2$, $R_3$, $R_4$, and $R_5$ are members selected from the group consisting of hydrogen, lower alkoxy with 1 to 5 carbon atoms, and $R_3$ and $R_4$ form the methylenedioxy group —O—CH$_2$—O— while $R_2$ and $R_5$ are hydrogen; and x and y are members selected from the group consisting of hydrogen and x and y form a double bond between the carbon atoms 5 and 6 of the pyrone ring, the improvement which consists in hydrogenating said pyrone compound in the presence of a catalyst of the platinum group at a temperature not exceeding 15° C., the initial hydrogenating temperature being between about −5° C. and about −10° C., and recovering the hydrogenation product from the hydrogenation mixture.

2. The process according to claim 1, wherein hydrogenation is effected at a temperature between about −5° C. and about −10° C.

3. The process according to claim 1, wherein the pyrone compound to be hydrogenated is 4-methoxy-6-(3',4'-methylene dioxy styryl)-5,6-dihydro-α pyrone.

4. The process according to claim 1, wherein the pyrone compound to be hydrogenated is 4-methoxy-6-styryl-5,6-dihydro-α-pyrone.

5. The process according to claim 1, wherein the pyrone compound is hydrogenated while being partly dissolved in an inert organic solvent and partly being in the undissolved state and whereby hydrogenation is discontinued as soon as the undissolved pyrone compound has been dissolved completely.

6. In a process of catalytically hydrogenating a pyrone compound of the formula

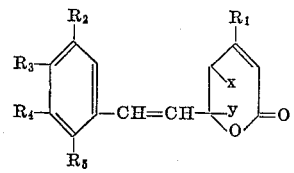

wherein $R_1$ is lower alkoxy with 1 to 5 carbon atoms;

$R_2$, $R_3$, $R_4$, and $R_5$ are members selected from the group consisting of hydrogen, lower alkoxy with 1 to 5 carbon atoms, and $R_3$ and $R_4$ form the methylenedioxy group —O—CH$_2$—O— while $R_2$ and $R_5$ are hydrogen; and x and y are members selected from the group consisting of hydrogen and x and y form a double bond between the carbon atoms 5 and 6 of the pyrone ring, the improvement which consists in partly dissolving the pyrone compound to be hydrogenated in a lower alkanol, hydrogenating the pyrone compound in the resulting mixture in the presence of a catalyst of the platinum group at a temperature not exceeding 15° C., the initial hydrogenating temperature being between about −5° C. and about −10° C., discontinuing hydrogenation as soon as the pyrone compound is completely dissolved, and recovering the hydrogenation product from the hydrogenation mixture.

References Cited

Werny et al.: Naturwiss, vol. 50, May 1963, p. 355.

ALEX MAZEL, Primary Examiner

A. M. T. TIGHE, Assistant Examiner

U.S. Cl. X.R.

260—240D